UNITED STATES PATENT OFFICE.

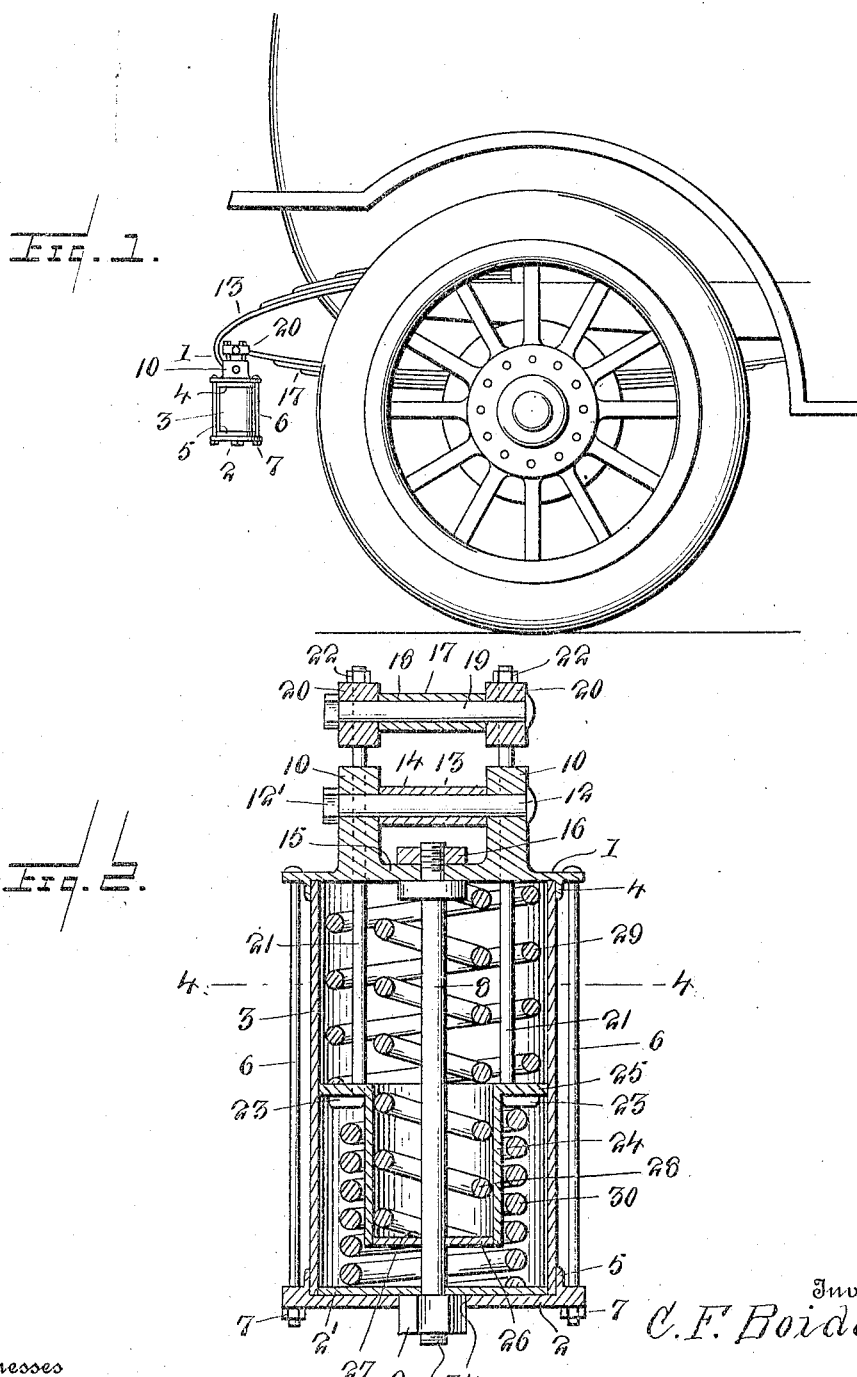

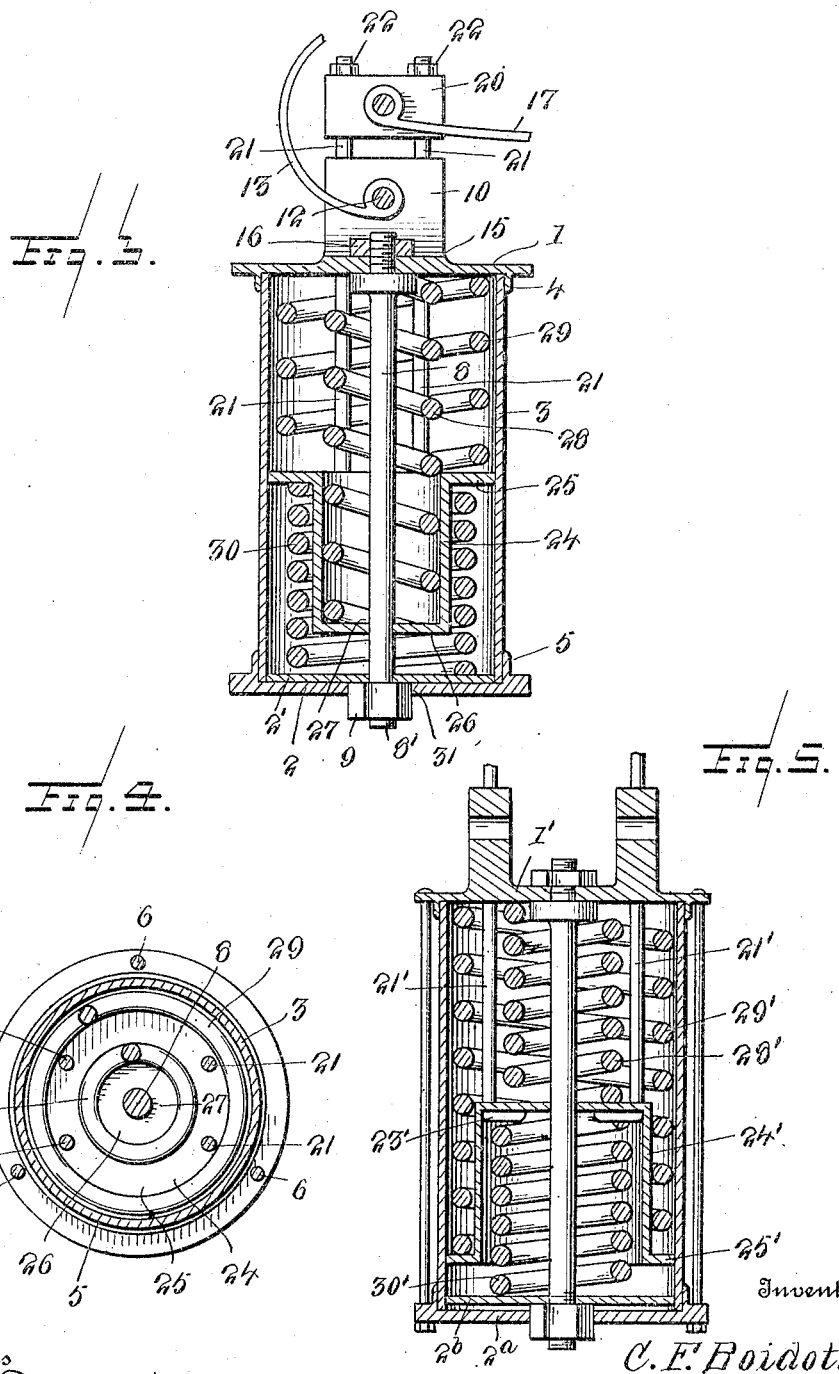

CHARLES F. BOIDOT, OF CHICAGO, ILLINOIS.

SHOCK-ABSORBER.

1,088,523.

Specification of Letters Patent.

Patented Feb. 24, 1914.

Application filed April 19, 1913. Serial No. 762,291.

*To all whom it may concern:*

Be it known that I, CHARLES F. BOIDOT, a citizen of France, residing at Edgewater, Chicago, in the county of Cook and State of Illinois, have invented new and useful Improvements in Shock-Absorbers, of which the following is a specification.

This invention relates to shock absorbers, the object in view being to provide a simple, compact and effective device of the class described which is adapted for use on any vehicle in which the body is supported relatively to the axles by means of springs, the shock absorbing device being designed and adapted to absorb all ordinary road shocks to which the wheels, axles, and axle springs are subjected, preventing the transmission of such shocks to the body of the vehicle, adding materially to the comfort of the occupants of the vehicle and the life and durability of the vehicle as a whole.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation, showing one of the shock absorbers of this invention applied to a motor vehicle, such as an automobile. Fig. 2 is a central longitudinal section through the shock absorber. Fig. 3 is a diametrical longitudinal section taken at right angles to Fig. 2. Fig. 4 is a section on the line 4—4 of Fig. 2. Fig. 5 is a vertical section through the shock absorber showing another arrangement of springs and seat.

The shock absorber contemplated in this invention has a general cylindrical shape, as shown in Fig. 1, and in the preferred embodiment thereof, the frame of the shock absorber comprises an upper head 1, a lower head 2, and a cylindrical casing 3 which is held between annular flanges 4 and 5 on the adjacent faces of the top and bottom heads 1 and 2, the heads and casing being held together in fixed relation by means of tie bolts 6 which pass through holes in both heads and are secured by nuts 7. This provides a practically dust-proof casing, in which the shock-absorbing springs, hereinafter particularly described, are inclosed.

A bottom plate 2' is supported from the top head 1 by means of a centrally located bolt 8 which extends through openings in both of said members 1 and 2', and has its lower end threaded to receive a nut 9 which bears against the bottom of the bottom plate 2', as shown.

Extending upwardly from the upper head 1 are two arms 10 arranged in spaced relation to each other, as shown, a spring retaining bolt 12 extending through said arms and being fastened by means of a nut 12', 13 designating one end of the body spring which is provided with an eye 14, through which the bolt 12 passes, thus forming a connection between the body spring and the body or frame of the shock absorber. The arms 10 are shown as extending upwardly from a connecting base 15, through which the bolt 8 passes, the upper end of said bolt being held by a nut 16 bearing against the base 15.

17 designates the axle spring which is provided at one end with an eye 18, through which passes a bolt 19, said bolt also passing through a pair of blocks 20 arranged in spaced relation to each other. These blocks carry the upper ends of a series of suspension bolts 21, four of such bolts being shown, although the number thereof may be increased or diminished in accordance with the strength required. The upper ends of these bolts pass through the blocks 20 and receive retaining nuts 22 on the upper ends thereof. The bolts pass downwardly through bolt holes formed in and extending lengthwise of the arms 10, and also through the upper head 1 of the casing, the lower extremities of said bolts being provided with L-shaped heads 23 extending laterally and radially outwardly, for a purpose which will hereinafter appear.

24 designates a spring holding seat or cup in the form of a hollow cylinder provided at its upper edge with an outwardly extending circumferential flange 25, the outer edge of which rides in contact with or in close proximity to the inner surface of the casing or shell 3. The flange 25 is provided with a number of openings corresponding with the number of bolts 21, through which said bolts pass and are adapted to slide under extreme conditions, the heads 23 of the bolts underlying and bearing against the flange 25. The bottom of said cup or seat is closed by a bottom plate 26 having formed therein a central opening 27, through which the bolt 8, hereinabove referred to, passes. This enables the seat or cup to slide relative to and upon the bolt 8.

Housed within the cup or seat 24 is the lower end portion of an expansion or compression spring 28, the upper portion of which is contained between the bolts 21, and the upper extremity of which bears against the under side of the top head 1. Another expansion or compression spring 29 of larger diameter encircles the bolts 21, just inside of the casing 3, the upper end of said spring bearing against the bottom of the top head 1, and the lower end of said spring finding its support on the flange 25 of the cup or seat 24.

Another coiled expansion spring 30 encircles the cup or seat 24 bearing at its upper end against the bolt heads 23, and at its lower end against the bottom plate 2'.

The weight of the vehicle and its load is borne by the springs 28 and 29 which serve to absorb the ordinary road shocks, to which a vehicle is subjected, while the spring 30 is designed to take up the rebound of the body in the upward movement or thrust thereof, as the springs 28 and 29 quickly expand, after being compressed by the load being thrown thereon. The shock caused by the rebound or upward movement of the vehicle body is often more disagreeable than the downward movement of the body, and this upward movement is taken care of and checked by the reflex expansion or compression spring 30.

The spring 28 is made stiff enough to sustain the load of the machine when traveling over ordinarily good roads thereby adding to the comfortable riding qualities of the machine. The spring 29 acts in an auxiliary capacity or in other words is brought into action only when unusually severe shocks are experienced and there is a downward thrust of the vehicle body. At such times, the centrally arranged spring 28 would be insufficient to withstand the shock and therefore at such time the auxiliary spring 29 is brought into play and compressed between the flange 25 and the upper head end of the casing. In the rebound, the spring 30 comes into play, having been previously compressed against the flange 25 by means of the plate 2' and nut 9. On the downward thrust of the body the spring 30 is relieved, and on the rebound it will be compressed again to its former tension therefore effecting a check on the violent rebound of the body. The bolt 8 is therefore only subject to the stresses necessary to keep the spring 30 conveniently compressed and acts to compress said spring again on the upward movement of the body after being relieved on the downward movement of said body.

It will further be seen that the spring seat or cup 24 is suspended by the bolts 12, which are in turn supported by the axle spring 17, and the cup or seat 24 in turn supports the inner shock absorbing spring 29, while the bottom plate 2' which supports the spring 30 is in turn supported by the centrally located bolt 8, the latter serving to take the stress of the spring 30 as the latter checks the body of the vehicle and its load.

It will be noted that the nut 9 bears against the bottom of the plate 2' and is free to project through an opening 31 in the bottom head 2, corresponding in shape to the nut 9 so as to prevent said nut from getting loose. When the check spring 30 is primarily compressed, the bottom head is removed, and after adjusting the tension of the spring 30 said head is replaced and fastened by the tie bolts 6, the bottom head 2 then serving as a lock for the nut 9.

In Fig. 5 I have illustrated another arrangement of springs and spring seat. Referring to said figure it will be noted that the cup shaped spring seat 24' is inverted as compared with the arrangement shown in Figs. 2 and 3, the spring 28' being interposed between the top of the member 24' and the upper head 1' of the casing while the spring 29' surrounds the suspension bolts 21', one end of said spring bearing against the head 1' and the opposite end of said spring bearing against the flange 25' of said cup shaped seat. The spring 30' is arranged within the seat and bears at its lower end against the bottom plate 2ᵇ. It will also be noted that the suspension bolts 21' pass through the top wall of the cup shaped seat 24' and the heads 23' of said bolts are turned inwardly toward each other. The operation of the shock absorber illustrated in Fig. 5 is on the same principle as that shown in Figs. 2 and 3 the only difference being in a rearrangement of the main and auxiliary springs which sustain the load and shocks, and the check spring which cushions the rebound.

It will be understood that the diameter of the casing and its springs, as well as the number of convolutions in the springs, may be increased or diminished in accordance with the weight of the load, and any desired number of shock absorbers may be employed in a single vehicle, as may be found expedient in practice. In each shock absorber, the entire spring mechanism is inclosed within a practically dust-proof casing, thereby maintaining the working parts of the shock absorber in perfect condition.

What is claimed is:

1. A shock absorber comprising a frame embodying oppositely located heads, a cup shaped spring seat movable back and forth between said heads, a coiled spring arranged in said seat and bearing against one of the heads of the frame, sliding suspension bolts connected to said seat and passing through openings in the frame, a rebound absorbing spring acting against the other head in opposition to the first mentioned spring, means for connecting said frame to a vehicle, and means for connecting said bolts to a relatively movable part of the vehicle whereby the spring is adapted to absorb road shocks of the wheels and prevent the transmission of the same to the vehicle body.

2. A shock absorber comprising a frame embodying oppositely located heads, a cup shaped spring seat movable back and forth between said heads, a bottom plate also movable back and forth between said heads, suspending means connecting said bottom plate with the upper head, a coiled spring arranged in said seat and bearing against one of the heads of the frame, sliding suspension bolts connected to said seat and passing through openings in the frame, a check spring interposed between said seat and bottom plate, means for connecting said frame to a vehicle, and means for connecting said bolts to a relatively movable part of the vehicle, whereby the spring is adapted to absorb road shocks of the wheels and prevent the transmission of the same to the vehicle body.

3. A shock absorber comprising a frame embodying oppositely located heads, a cup shaped spring seat movable back and forth between said heads, a coiled spring arranged in said seat and bearing against one of the heads of the frame, sliding suspension bolts connected to said seat and passing through openings in the frame, means for connecting said frame to a vehicle, means for connecting said bolts to a relatively movable part of the vehicle, whereby the spring is adapted to absorb road shocks of the wheels and prevent the transmission of the same to the vehicle body, a shell or casing surrounding and inclosing said spring seat and interposed between said heads, and tie bolts fastening the top and bottom heads against said shell.

4. A shock absorber comprising a cylindrical casing embodying oppositely arranged heads, a cylindrical shell interposed between the heads, a centrally arranged supporting bolt connected to the upper head, a bottom plate supported by said bolt, suspension bolts slidable through openings in one of the heads, a cup shaped spring seat supported by said suspension bolts and slidable therewith, a coiled spring having one end bearing against said seat and the other end against one of the casing heads, a check spring bearing against and acting to resist the upward movement of said bottom plate, blocks carried by the outer projecting ends of said bolts, and attaching bolts carried by said blocks and the frame of the shock absorber adapting the relatively movable parts of the shock absorber to be secured to relatively movable parts of a vehicle.

In testimony whereof I affix my signature in presence of two witnesses.

CHARLES F. BOIDOT.

Witnesses:
 ANDREW CATELAE,
 NEIL H. DONN ETTON.

Copies of this patent may be obtained for five cents each, by addressing the "Commissioner of Patents, Washington, D. C."